(12) United States Patent
Yoshida et al.

(10) Patent No.: US 6,254,958 B1
(45) Date of Patent: Jul. 3, 2001

(54) PHOTOSENSITIVE RESIN COMPOSITION AND ARTICLES

(75) Inventors: Kenji Yoshida; Kiyohisa Tokuda; Kazuhiko Ishii, all of Saitama-ken (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/117,128

(22) PCT Filed: Dec. 2, 1997

(86) PCT No.: PCT/JP97/04403

§ 371 Date: Jul. 22, 1998

§ 102(e) Date: Jul. 22, 1998

(87) PCT Pub. No.: WO98/24824

PCT Pub. Date: Jun. 11, 1998

(30) Foreign Application Priority Data

Dec. 3, 1996 (JP) .................................................. 8-336299
May 20, 1997 (JP) .................................................. 9-144506
Aug. 6, 1997 (JP) .................................................. 9-222980

(51) Int. Cl.$^7$ ........................................................ B32B 9/02
(52) U.S. Cl. .......................... 428/64.2; 428/195; 428/211; 428/533; 428/535; 428/537.5; 524/47; 522/79; 522/80; 522/87; 522/88; 522/116; 522/120; 522/121; 522/152
(58) Field of Search ............................... 524/47; 522/80, 522/79–87, 88, 116, 120, 121, 152; 428/64.2, 64.9, 533, 535, 537.5, 195, 326, 211

(56) References Cited

U.S. PATENT DOCUMENTS

| | | | | |
|---|---|---|---|---|
| 3,901,838 | * | 8/1975 | Clendinning et al. | 260/23 |
| 4,279,961 | * | 7/1981 | Fujioka et al. | 428/328 |
| 4,405,426 | | 9/1983 | Hosoi et al. | 204/159.15 |
| 4,424,314 | * | 1/1984 | Barzynski et al. | 525/454 |
| 4,605,465 | * | 8/1986 | Morgan | 156/273.3 |
| 4,847,143 | * | 7/1989 | Watanabe et al. | 428/288 |
| 4,943,612 | * | 7/1990 | Morita et al. | 524/714 |
| 5,212,008 | | 5/1993 | Malhotra et al. | 428/216 |
| 5,268,407 | * | 12/1993 | Hayashi et al. | 524/398 |
| 5,376,496 | * | 12/1994 | Elsaesser et al. | 430/165 |
| 5,409,798 | * | 4/1995 | Kondo et al. | 430/230 |
| 5,573,831 | | 11/1996 | Suzuki et al. | 428/64.1 |

FOREIGN PATENT DOCUMENTS 57-100434  6/1982 (JP) .
2-192988  7/1990 (JP) .

* cited by examiner

Primary Examiner—Alexander S. Thomas
(74) Attorney, Agent, or Firm—Nields & Lemack

(57) ABSTRACT

The present invention aims to develop a photosensitive resin composition which exhibits a rapid ink absorption rate, which has an excellent water resistance, and which is appropriate for providing an ink receiving layer forming a sharp ink dot shape and having an excellent color formability of ink. A photosensitive resin composition forming an excellent ink receiving layer is obtained by incorporating at least one selected from an ethylenically unsaturated group-containing compound having quaternary nitrogen and a grain flour (filler) such as a wheat flour or the like in a photosensitive resin composition containing a quaternary nitrogen-free ethylenically unsaturated group-containing compound, a photopolymerization initiator etc.

8 Claims, No Drawings

PHOTOSENSITIVE RESIN COMPOSITION AND ARTICLES

TECHNICAL FIELD

The present invention relates to a photosensitive resin composition and an article having a thin layer formed of its cured product. The photosensitive resin composition of the present invention is especially appropriate as an ink receiving layer of an ink jet recording medium because a thin film of its cured product gives a high-quality image having an excellent ink absorption and the resulting printed letter or image exhibits an excellent water resistance.

BACKGROUND ART

In an ink jet recording method, droplets of ink are generated and scattered by various ink (recording liquid) jet steps, for example, an antistatic suction step, a step of applying mechanical vibration or displacement to ink upon using a piezoelectric element and a step of utilizing a pressure generated by bubbling ink through heating, and a part or all of the droplets are adhered to a recording medium such as paper for recording. This method has been rapidly applied to a variety of facsimiles or printers in recent years because noise is reduced, high-speed recording is possible, a full color is easily obtained, a hard copy can easily be provided, and coloration can be conducted at a low cost. As a recording medium appropriate for this ink jet recording method, there are a paper of which the surface is coated with a pigment such as silica or the like to form a porous layer, and a product obtained by applying a resin that absorbs ink through dissolution or swelling to a plastic substrate (for example, a molded article or a film of a polyester, polymethyl methacrylate or a polycarbonate) through coating or printing. Examples of such a recording medium include an ink jet OHP (overhead projector) film and an optical disk.

As an ink absorption layer, an ink absorption layer cured and coated with an ultraviolet-curing or heat-curing resin having a hydrophilic group is generally formed on a substrate surface in many cases. This layer tends to be soluble in water. When water is sprayed on the image, the image is easily destroyed. Even if the ink absorption layer is itself not dissolved in water, it is swollen when the substrate having the image is dipped in water. As a result, the dye forming the image is easily escaped in water, and the image is disarranged (lack of a water resistance).

As a dye of ink for ink jet, a direct dye or an acid dye is often used, and addition of a cationic dye binder to an ink receiving layer is proposed to solve the above-mentioned defect (Japanese Patent Laid-Open No. 261,089/1986). However, a dye binder which can be incorporated into a water-soluble resin is itself water-soluble in many cases. Although a portion bound to a dye is water-insoluble, the other portion is water-soluble, making it hard to obtain a satisfactory water resistance of a film in an ink receiving layer.

Japanese Patent Laid-Open No. 10,438/1986 proposes that cationic polyvinyl alcohol (hereinafter referred to as "cationic PVA") or its crosslinked product is incorporated into an ink receiving layer as a water-soluble polymeric substance. In this instance, mere incorporation of cationic PVA does not provide a satisfactory water resistance of the ink receiving layer itself as is the case with a cationic dye binder. Meanwhile, when using the crosslinked product of cationic PVA, water resistances of both the ink receiving layer and the image are obtained, but cationic PVA has to be used as a water-soluble resin. The selection range of the binder is narrow, and a ratio of a cationic group in the ink receiving layer is hardly increased. In a full color application in which a large amount of ink is used in the recording, a dryability and a water resistance of ink are not satisfactory. In addition, Japanese Patent Laid-Open No. 141,584/1986 proposes that an absorption of ink is improved by incorporating amorphous silica in a water-soluble resin. Further, the use of porous substances, for example, clay, talc, diatomaceous earth, calcium carbonate, calcium sulfate, barium sulfate, aluminum silicate, synthetic zeolite, alumina, zinc oxide, lithophone, and inorganic pigment particles such as titanium white is proposed (Japanese Patent Laid-Open No. 228,984/1986, and Japanese Patent Publication No. 1,706/1992). These methods improved the absorption of ink, but were still unsatisfactory in the full color application.

It is an object of the present invention to develop a photosensitive resin composition which exhibits a rapid ink absorption, which has an excellent water resistance, and which is appropriate for providing an ink receiving layer forming a sharp ink dot shape and having an excellent color formability of ink.

DISCLOSURE OF THE INVENTION

The present inventors have assiduously conducted investigations to solve the above-mentioned problems, and have consequently found quite unexpectedly that when a grain flour (filler) such as a wheat flour or the like or an ethylenically unsaturated group-containing compound having quaternary nitrogen or both of them are present in a photosensitive resin composition, a cured product forming an ink receiving layer which is excellent in all of a dryability, a water resistance, a durability, a feeding property, a curliness and the like of ink is obtained. This finding has led to the completion of the present invention.

That is, the present invention relates to a photosensitive resin composition characterized by containing at least one selected from an ethylenically unsaturated group-containing compound having quaternary nitrogen and a grain flour (filler) such as a wheat flour or the like. More specifically, the present invention relates to the following (1) to (15).

1. A photosensitive resin composition containing a grain flour (filler) such as a wheat flour or the like, an ethylenically unsaturated group-containing compound and a photopolymerization initiator.

2. The photosensitive resin composition of the above-mentioned 1 which contains a polymer.

3. A photosensitive resin composition containing an ethylenically unsaturated group-containing compound having quaternary nitrogen, a quaternary nitrogen-free ethylenically unsaturated group-containing compound, a photopolymerization initiator, a filler and a polymer.

4. The photosensitive resin composition of the above-mentioned 3, wherein the filler is a wheat flour.

5. The photosensitive resin composition of the above-mentioned 1, 2, 3 and 4, wherein the quaternary nitrogen-free ethylenically unsaturated group-containing compound is an N-alkoxymethyl (meth)acrylamide.

6. The photosensitive resin composition of the above-mentioned 1, 2, 3, 4 and 5, which contains the filler other than the wheat flour.

7. The photosensitive resin composition of the above-mentioned 1 to 6, wherein the N-alkoxymethyl (meth)acrylamide is N-methoxymethyl (meth)acrylamide.

8. The photosensitive resin composition of the above-mentioned 1 to 7, wherein the ethylenically unsaturated group-containing compound having quaternary nitrogen is a (meth)acryloyloxy lower alkyl tri-lower-alkyl ammonium lower alkyl sulphate.

9. A photosensitive resin composition in which (A) an ethylenically unsaturated group-containing compound is between 40 and 60% by weight, (B) an ethylenically unsaturated group-containing compound having quaternary nitrogen is between 0.1 and 5% by weight, (C) a photopolymerization initiator is between 2 and 8% by weight, (D) a polymer is between 1 and 10% by weight, and (E) a filler is between 10 and 40% by weight.

10. An article having a thin film formed of a cured product of the photosensitive resin composition recited in any one of the above-mentioned 1 to 9 on the surface.

11. The article of the above-mentioned 10, in which the thickness of the thin film formed of the cured product is between 1 and 100 μm.

12. The article of the above-mentioned 11 which is a recording medium.

13. The article of the above-mentioned 12, wherein the recording medium is an ink jet paper, OHP or a disk-like electronic recording medium.

14. The article of the above-mentioned 11 to 13, wherein the thin film of the recording medium is printed with aqueous ink.

15. A photosensitive resin composition characterized by containing at least one selected from an ethylenically unsaturated group-containing compound having quaternary nitrogen and a grain flour (filler) such as a wheat flour or the like.

The "photosensitive resin composition" in the present invention means a resin composition which is polymerized with energy rays such as ultraviolet rays, x-rays, visible rays and the like. This resin composition is not particularly limited. Generally, such a resin composition contains a quaternary nitrogen-free ethylenically unsaturated group-containing compound which is polymerizable with energy rays, and a polymerization initiator. Further, it contains a filler, a polymer and other additives such as an antioxidant, a defoamer, a leveling agent, a light stabilizer, a polymerization inhibitor and the like as required. Accordingly, the resin composition of the present invention can be obtained by incorporating a grain flour (filler) such as a wheat flour or the like, or/and an ethylenically unsaturated group-containing compound having quaternary nitrogen into a resin composition known so far as a ultraviolet-curing resin composition or the like(adding them to the known resin composition, or replacing a part or the whole of the filter in the known composition with a grain flour (filler) such as a wheat flour or the like, or replacing a part of a polymerizable quaternary nitrogen-free ethylenically unsaturated group-containing compound with an ethylenically unsaturated group-containing compound having quaternary nitrogen). When the term merely "an ethylenically unsaturated group-containing compound" is used in the present invention, it refers to both a compound having quaternary nitrogen and a quaternary nitrogen-free compound.

BEST MODE FOR CARRYING OUT THE INVENTION

As the quaternary nitrogen-free ethylenically unsaturated group-containing compound (A) used in the present invention, any compound which is generally employed in an ultraviolet-curing resin composition can be used. It includes a photopolymerizable monomer and a photopolymerizable oligomer. The photopolymerizable monomer is grouped into a monofunctional monomer, a difunctional monomer and a three or more polyfunctional r monomer. Preferable examples thereof include acrylic or methacrylic [(meth)acrylic] monomers or oligomers. Examples of the monofunctional monomer include N-alkoxymethyl (meth)acrylamides such as N-methoxyemthyl (meth)acrylamide and N-ethoxymethyl (meth)acrylamide, 2-hydroxyethyl (meth)acrylate, 2-hydroxypropyl (meth)acrylate, 4-hydroxybutyl (meth)acrylate, 2-ethylhexyl (meth)acrylate, 2-ethylhexyl polyethoxy(meth)acrylate, ethylcarbitol (meth)acrylate, carbitol (meth)acrylate, tetrahydrofurfuryl (meth)acrylate, N,N-dimethylaminoethyl (meth)acrylate, N,N-diethylaminoethyl (meth)acrylate, 3-(N,N-dimethylamino)propyl (meth)acrylate, 3-(N,N-dimethylamino)propyl (meth)acrylamide, N,N-diethylaminoethylvinyl ether, 4-vinylpyridine, (meth)acrylamide, N-vinylpyrroridone, N-vinyl caprolactam, acrylmorpholino, N,N-dimethylamino(meth)acrylate, N,N-dimethyl (meth)acrylamide, N-vinylcaprolactam, dicyclopentenyl (meth)acrylate, dicyclopentenyloxyethyl (meth)acrylate, hydrogenated dicyclopentenyl (meth)acrylate, isobornyl (meth)acrylate, cyclohexane-1,4-dimethylol mono (meth)acrylate, o-phenyl•phenyloxyethyl (meth)acrylate, o-phenyl•phenyloxyethyloxyethyl (meth)acrylate, phenyloxyethyl (meth)acrylate, tribromophenyloxyethyl (meth)acrylate and phenoxyethyl (meth)acrylate.

Examples of the difunctonal monomer include 1,6-hexanediol di(meth)acrylate, neopentyl glycol di(meth)acrylate, 1,9-nonanediol di(meth)acrylate, neopentyl glycol polypropoxydi(meth)acrylate, hydroxypivalic acid neopentylglycol di(meth)acrylate, bisphenol A polyethoxydi(meth)acrylate, bisphenol F polyethoxydi(meth)acrylate, polyethylene glycol di(meth)acrylate and bis[(meth)acryloyloxyethyl]hydroxyethyl isocyanurate.

Examples of the polyfunctional monomer include trimethylolpropane tri(meth)acrylate, trimethyloloctane tri(meth)acrylate, trimethylolpropane polyethoxytri(meth)acrylate, trimethylolpropane polypropoxytri(meth)acrylate, tris[(meth)acryloyloxyethyl] isocyanurate, pentaerythritol tri(meth)acrylate, pentaerythritol polyethoxytetra(meth)acrylate, pentaerythritol polypropoxytetra(meth)acrylate, pentaerythritol tetra(meth)acrylate, ditrimethylolpropane tetra(meth)acrylate, dipentaerythritol penta(meth)acrylate, dipentaerythritol hexa(meth)acrylate and caprolactone-modified tris[(meht)acryloyloxyethyl] isocyanurate.

Examples of the photopolymerizable oligomer include an epoxy (meth)acrylate, a urethane (meth)acrylate and a polyester (meth)acrylate. Examples of the epoxy (meth)acrylate include a reaction product of an epoxy resin and an unsaturated group-containing compound having one carboxylic acid in a molecule, and a reaction product of the above-mentioned reaction product and a polybasic anhydride. Examples of the epoxy resin include a bisphenol A-type epoxy resin, a bisphenol F-type epoxy resin, a phenol novolak-type epoxy resin, a cresol novolak-type epoxy resin, a trisphenolmethane-type epoxy resin, a biphenyl-type epoxy resin, an aliphatic glycidyl ether and an alicyclic epoxy resin. Examples of the unsaturated group-containing compound having one carboxylic acid in a molecule include (meth)acrylic acid and a (meth)acrylic acid dimer. Examples of the polybasic acid in the polybasic acid anhydride include maleic acid, succinic acid, adipic acid, phthalic acid, terephthalic acid, isophthalic acid, tetrahydrophthalic acid, hexahydrophthalic acid and methyltetrahydrophthalic acid.

Examples of the urethane (meth)acrylate include reaction products of polyols, for example, polyols (a) such as ethylene glycol, propylene glycol, diethylene glycol, neopentyl glycol, neopentyl glycol, 1,6-hexanediol, 1,4-butanediol, polytetramethylene glycol, polybutadienediol, bisphenol A polyethoxydiol and trimethylolpropane, polyester polyols (a-1) which are reaction products of the polyols (a) and polybasic acids (for example, maleic acid, succinic acid, adipic acid, phthalic acid, terephthalic acid, isophthalic acid, tetrahydrophthalic acid, hexahydrophthalic acid and methyltetrahydrophthalic acid) or acid anhydrides thereof, polycaprolactone polyols (a-2) which are reaction products of the polyols (a) and ε-caprolactone or the polyols (a), the above-mentioned polybasic acids or acid anhydrides thereof and E-caprolactone, or polycarbonate polyols (a-3), organic polyisocyanates (for example, tolylene diisocyanate, isophorone diisocyanate, hexamethylene diisocyanate, bis(4-isocyanatophenyl)methylene, xylylene diisocyanate, hexamethylene diisocyanate and a trimer of hexamethylenediisocyanate) and hydroxyl group-containing (meth)acrylates (for example, 2-hydroxyethyl (meth)acrylate, 2-hydroxypropyl (meth)acrylate, 4-hydroxybutyl (meth)acrylate, pentaerythritol (meth)acrylate and dipentaerythritol penta(meth)acrylate); or urethane acrylates which are reaction products of the above-mentioned organic polyisocyanates and hydroxyl group-containing (meth)acrylates, (meth)acrylic acid ester of polyester polyal(a-1) mentioned above, unsaturated polyesters, silicon (meth)acrylates or polybutadiene poly(meth)acrylates.

The polyester (meth)acrylate can be obtained as, for example, M-6100, M-6200, M-6250, M-6400, M-6500, M-7100, M-8030, M-8060, M-8100, M-8530, M-8560 and M-9050 (all supplied by Toa Gosei Chemical Industry Co., Ltd.).

In the present invention, the above-mentioned monomers can be used as the quaternary nitrogen-free ethylenically unsaturated group-containing compound (A). Of these, the hydrophilic monomer is preferable. Specific examples of this momoner include N-alkoxymethyl (meth)acrylamides such as N-methoxymethyl(meth)acrylamide and N-ethoxymethyl(meth)acrylamide; tertiary nitrogen-containing vinyl compounds such as acrylmorpholine, N-vinylpyrrolidone and N-vinylcaprolactam; hydroxyl group-containing compounds such as 2-hydroxyethyl (meth)acrylate, 2-hydroxypropyl (meth)acrylate and 4-hydroxybutyl (meth)acrylate; tetrahydrofurfuryl (meth)acrylate; phenoxyethyl (meth)acrylate; (meth)acrylamide; dimethyl (meth)acrylamide; diethyl amino(meth)acrylate; dimethylaminopropyl(meth)acrylamide; dimethylaminoethyl (meth)acrylate; dimethyl amino(meth)acrylate; N,N-diethylaminoethyl (meth)acrylate; 3-(N,N-dimethylamino) propyl (meth)acrylate; N,N-diethylaminoethylvinyl ether; 4-vinylpyridine; bis[(meth)acryloyloxyethyl]hydroxyethyl isocyanurate; tris[(meth)acryloyloxyethyl] isocyanurate; caprolactone-modified tris[(meth)acryloyloxyethyl] isocyanurate; polyethylene glycol di(meth)acrylate; pentaerythritol tri(meth)acrylate; trimethylolpropane polyethoxytri (meth)acrylate; and pentaerythritol polyethoxytetra(meth)acrylate. These can be used either singly or in combination. Further, these hydrophilic monomers and non-hydrophilic monomers may be used in combination.

In the present invention, as the quaternary nitrogen-free ethylenically unsaturated group-containing compound (A) component, an N-alkoxymethyl(meth)acrylamide is used especially preferably. As the alkoxy here, an alkoxy having from 1 to 20 carbon atoms is available. Preferable is an alkoxy having from 1 to 6 carbon atoms. More preferable are a methoxy group, an ethoxy group and a butoxy group. The use of the N-alkoxymethyl(meth)acrylamide can improve an absorption, a dryability and a fixing property of ink for ink jet to an ink receiving layer.

As the ethylenically unsaturated group-containing compound having quaternary nitrogen (B), any ethylenically unsaturated group-containing compound having quaternary nitrogen can be used. Preferable is an O- or N-lower alkyl tri-lower-alkyl ammonium compound of (meth)acrylic acid or (meth)acrylamide. Specific examples of the ethylenically unsaturated group-containing compound(B) having quaternary nitrogen include (meth)acryloyloxy lower alkyl tri-lower-alkylammonium lower alkyl sulfates such as (meth)acryloyloxyethyltrimethylammoniummethyl sulfate and (meth)acryloyloxypropyltrimethylammoniummethyl sulfate; (meth)acryloyloxyethyltrimethylammonium-p-toluene sulfonate; and (meth)acrylamidopropyltrimethylammoniumdimethyl sulfate. Incorporation of the component (B) into the composition can improve a fixing property and a water resistance of an ink for ink jet to an ink receiving layer. The "lower alkyl" in the present invention refers to an alkyl having from 1 to 6 carbon atoms, preferably an alkyl having from 1 to 3 carbon atoms.

As the photopolymerization initiator (C) used in the present invention, any known photopolymerization initiator is available. Specific examples of the photopolymerization initiator available include 2-hydroxy-2-methylpropiophenone, 4-isopropyl-2-hydroxy-2-methylpropiophenone, benzyl dimethyl ketal, 1-hydroxycyclohexyl phenyl ketone, benzophenone, 2-methyl-1-[4-(methylthio)phenyl]-2-morpholinopropane-1, 2,4,6-trimethylbenzoylphenylphosphine oxide and bis(2, 6-dimethoxybenzoyl)-2,4,4-trimethylpentyl phosphinoxide. These photopolymerization initiators can be used also in combination with an auxiliary agent for polymerization initiator such as tertiary amines or the like.

As the polymer (D) component used in the photosensitive resin composition of the present invention, both a hydrophilic polymer and a non-hydrophilic polymer can be used. A hydrophilic polymer is preferable. Examples of the hydrophilic polymer available include modified polyvinyl acetate, polyvinyl alcohol, polyethylene glycol, polypropylene glycol, polyacrylamide, polyvinyl ether, a polymaleic acid copolymer, polyethyleneimide and polyvinylpyrrolidone. In addition to these, a copolymer and a homopolymer formed by subjecting the above-mentioned tertiary nitrogen or hydroxyl group-containing hydrophilic monomer to the known solution polymerization are also available. Of these, modified polyvinyl acetate or polyvinylpyrrolidone is preferable. Further, modified polyvinyl acetate is especially preferable. This can be obtained from the market as, for example, "Goselan L-0301" supplied by The Nippon Synthetic Chemical Industry Co., Ltd. These polymers can be used either singly or in combination by dissolving or dispersing the same.

In the present invention, the filler (E) is used to improve a fixing property of ink and a water absorption. As the filler (E), both an inorganic filler and an organic filler can be used. Specific examples of the inorganic filler include porous particles such as silica, clay, talc, diatomaceous earth, calcium carbonate, calcium sulfate, barium sulfate, aluminum silicate, synthetic zeolite, smectites, montmorillonite mineral, synthetic mica and alumina; and inorganic pigment particles such as zinc oxide and titanium white. Examples of the organic filler include a grain flour such as a wheat flour, carbohydrates, celluloses and proteins (gluten). Of these, a grain flour such as a wheat flour or the like is preferable, and a wheat flour is especially preferable. These fillers may be used either singly or in combination. A combination of the inorganic filler and the organic filler, preferably the grain four, more preferably the wheat flour is preferable. The wheat flour which can be used is not particularly limited. The particle diameter of the wheat flour is usually between 0.01 and 70 µm, preferably between 0.01 and 50 µm, more preferably between 0.01 and 30 µm.

Ingredients of a wheat flour in an amount of 100 g are as follows.

| protein | 8 g | |
|---------|-----|---|
| lipid | 2 g | |
| carbohydrate | 76 g | (flour made by Nisshin Flour Milling Co., Ltd.) |
| water | 14 g | |

At this time, the protein can be divided into a soluble protein and a gluten protein. The ratio of these is usually 10–20:80–90%. The details are described in Science of Series Food, Science of Wheat Flour, compiled by Nagao Seiichi, Asakura Shoten (date of issue: Feb. 25, 1995, pp. 93–94).

In the present invention, the compound (F) having quaternary nitrogen except the compound (B) can be incorporated to improve more a fixing property of ink and a water absorption. The component (F) includes cationic and ampholytic compounds. Examples of the cationic compound include N-hydroxyethylpropylalkylamide nitrate, lauryltrimethylammonium chloride, stearyltrimethylammonium chloride, lauryldimethylbenzylammonium chloride and ethyl sulfate lanolin fatty acid aminopropylethyldimethylammonium. Examples of the ampholytic compound include lauryl betaine, stearyl betaine, coconut oil fatty acid amide propyldimethylamine acetic acid betaine oil and lecithin. These compounds have an antistatic property, and are usually called surfactants.

In the present invention, the photosensitive resin composition has to contain at least one selected from the ethylenically unsaturated group-containing compound having quaternary nitrogen and the grain flour (filler) such as a wheat flour or the like. In the case of the ethylenically unsaturated group-containing compound having quaternary nitrogen, the amount thereof is usually between 0.1 and 10% by weight, preferably between 0.1 and 8% by weight, more preferably between 0.1 and 5% by weight based on the total photosensitive resin composition. In the case of the grain flour (filler) such as a wheat flour or the like, it is usually between 0.1 and 60% by weight, preferably between 1 and 50% by weight, more preferably between 10 and 40% by weight based on the total photosensitive resin composition.

With respect to the preferable proportions of the each component in the photosensitive resin composition of the present invention, the quaternary nitrogen-free ethylenically unsaturated group-containing compound (A) is usually between 5 and 60% by weight, preferably between 20 and 60% by weight, more preferably between 40 and 60% by weight; the ethylenically unsaturated group-containing compound having quaternary nitrogen (B) is usually between 0.1 and 10% by weight, preferably between 0.1 and 8% by weight, more preferably between 0.1 and 5% by weight; the photopolymerization initiator (C) is usually between 0.01 and 10% by weight, preferably between 1 and 10% by weight, more preferably between 2 and 8% by weight; the polymer (D) is usually between 0.1 and 30% by weight, preferably between 1 and 20% by weight, more preferably between 1 and 10% by weight; the filler (E) is usually between 0.1 and 60% by weight, preferably between 1 and 50% by weight, more preferably between 10 and 40% by weight; and the compound (F) having quaternary nitrogen except the compound (B) is usually between 0 and 15%, preferably between 0 and 10%, more preferably between 0 and 5%.

The photosensitive resin composition of the present invention can further contain, for example, an antioxidant, a defoamer, a leveling agent, a light stabilizer and a polymerization inhibitor as required. As an antioxidant, for example, BHT Swanox (supplied by Seiko Kagaku K.K.) is mentioned. As a defoamer, for example, BYK-057 (supplied by Bick Chemie) is mentioned. As a leveling agent, for example, BYK-354 (supplied by Bick Chemie) is mentioned. As a light stabilizer, for example, LA-82 (supplied by Asahi Denka Kogyo K.K.) is mentioned. As a polymerization inhibitor, for example, Q-1301 (supplied by Wako Pure Chemical Industries, Ltd.) is mentioned.

The photosensitive resin composition of the present invention can be obtained, for example, by mixing the quaternary nitrogen-free ethylenically unsaturated group-containing compound (A), the photopolymerization initiator (C), the filler (E) and as required, the ethylenically unsaturated group-containing compound (B) having quaternary nitrogen and/or the polymer (D) and/or the compound (F) having quaternary nitrogen except the compound (B) through heating at from 30 to 80° C., further adding thereto additives such as an antioxidant, a defoamer, a leveling agent, a light stabilizer and a polymerization inhibitor as required, and uniformly mixing and dispersing them.

The cured product of the present invention can be formed by irradiating with energy rays such as ultraviolet rays, visible rays or the like on the coated film and the like of the above-mentioned photosensitive resin composition. As a light source, a metal halide lamp, a high-pressure mercury lamp and the like can be mentioned.

The article of the present invention has on its surface a thin film formed of the cured product of the above-mentioned photosensitive resin composition. As the article, a recording medium is mentioned. Examples of the recording medium include ink jet papers such as a paper for ink jet's exclusive use and an OHP sheet, and disk-like recording media such as CD-R (additional writing-type compact disk) and DVD (digital video disk).

The article of the present invention can be obtained by coating the photosensitive resin composition of the present invention on the article (substrate) with a film of thickness of from 1 to 100 μm as an ink receiving layer through screen-printing, by a bar coater method or the like, irradiating the coated article with energy rays such as ultraviolet rays or the like for curing to form a thin film-like ink receiving layer formed of the cured product of the photosensitive resin composition in the present invention. As the article (substrate), for example, paper and sheet-like or plate-like plastics (examples of its material include a polyester, polymethyl methacrylate and a polycarbonate) are mentioned. In the paper and the sheet-like or plate-like plastics, the surface forming the above-mentioned ink receiving layer may be treated with a primer or an overcoating agent.

As a dye to be used in aqueous ink for forming an image or printing a letter on the ink receiving layer formed of the cured product of the coating of the photosensitive resin composition in the present invention, a water-soluble dye is preferable. The amount of the water-soluble dye contained in ink is between 0.1 and 20% by weight, preferably between 0.5 and 10% by weight, more preferably between 1 and 8% by weight. The aqueous ink can further contain from 0 to 30% by weight of a water-soluble organic solvent and from 0 to 5% by weight of an ink adjustor.

Examples of the water-soluble dye include C.I. Direct Yellow 86, C. I. Acid Red 35, C. I. Direct Blue 86 and C. I. Food Black 2.

Examples of the water-soluble organic solvent include C1–C4 alkanols such as methanol, ethanol, propanol, isopropanol, butanol, i-butanol, sec-butanol and tert-butanol; carboxylic acid amides such as N,N-dimethylformamide and N,N-dimethylacetamide; lactams such as ε-caprolactam, N-methylpyrrolidin-2-one; urea; cyclic ureas such as 1,3-dimethylimidazolidin-2-one and 1,3-dimethylhexahydropyrimid-2-one; ketones or ketoalcohols such as acetone, methyl ethyl ketone and 2-methyl-2-hydroxypentan-4-one; ethers such as tetrahydrofuran and dioxane; mono-, oligo- or poly-alkylene glycols or thioglycols having a C2–C6 alkylene unit, such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; other polyols (triols) such as glycerin and hexane-1,2,6-triol; polyhydric alcohol C1–C4 alkyl ethers such as ethylene glycol monomethyl or monoethyl ether, diethylene glycol monomethyl or monoethyl ether, and triethylene glycol monomethyl or monoethyl ether; and γ-butyrolactone or dimethyl sulfoxide.

Of these water-soluble organic solvents, N-methylpyrrolidin-2-one and mono-, di- or tri-alkylene glycols having a C2–C6 alkylene unit, especially mono-, di- or tri-ethylene glycol, dipropylene glycol and dimethyl sulfoxide are preferable. N-methylpyrrolidin-2-one, diethylene glycol and dimethyl sulfoxide are especially preferable.

As the ink adjustor, for example, an antiseptic, a pH adjustor, a chelating agent, a rust-proofing agent, a water-soluble ultraviolet absorber, a water-soluble high-molecular compound, a dye dissolving agent and a surfactant are mentioned. Examples of the antiseptic include dehydroacetatic acid soda, sorbic acid soda, sodium 2-pyridinethiol-1-oxide, sodium benzoate and pentachlorophenol sodium. As a pH adjustor, any substance can be used so long as a pH of ink is adjusted within the range of from 8.0 to 11.0 without having an adverse effect on ink to be prepared. Examples thereof include alkanolamines such as diethanolamine and triethanolamine; alkali metal hydroxides such as lithium hydroxide, sodium hydroxide and potassium hydroxide;anmonium hydroxide and alkali metal carbonates such as lithium carbonate, sodium carbonate and potassium carbonate. Examples of the chelating agent include sodium ethylenediaminetetraacetate, nitrilo-triacetic acid trisodium salt, sodium hydroxyethylenediaminetriacetate, sodium diethylenetriaminepentaacetate and sodium uramildiacetate. Examples of the rust-proofing agent include an acidic sulfite, sodium thiosulfate, thioglycolic acid ammon, diisopropylammonium nitrite, pentaerythritol tetranitrate and dicyclohexylammonium nitrate.

The present invention is illustrated more specifically by referring to the following Examples. However, the present invention is not limited thereto. In the following Examples, "parts" and "%" are "parts by weight" and "% by weight" unless otherwise instructed. The values in Tables 1 and 3 are all indicated in terms of % by weight.

EXAMPLES 1 TO 5

Necessary components shown in Tables 1 and 3, among a quaternary nitrogen-free ethylenically unsaturated group-containing compound (A), a photopolymerization initiator (C), a filler (E), an ethylenically unsaturated group-containing compound (B) having quaternary nitrogen, a polymer (D) and a compound (F) having quaternary nitrogen except (B) were mixed in amounts shown in these tables (provided the amount of the component (E) to be added later was excluded) while being heated at from 30 to 80° C. Further, the component (E) and, as required, additives such as an antioxidant, a defoamer, a leveling agent, a light stabilizer and a polymerization inhibitor were added thereto. These were uniformly mixed, and dispersed. In this manner, photosensitive resin compositions of the present invention and those for comparison were prepared. Each of the resulting compositions was coated on a polyethylene terephthalate film having a thickness of 100 μm by a bar coater method such that the thickness of the film after curing was between 5 and 12 μm. The coated product was irradiated with ultraviolet rays to cure the coated film. In this manner, a recording medium was prepared. The following tests were conducted using this recording medium.

The formulation of ink used is as follows.

| Yellow ink: | C.I. Direct Yellow 86 | 2 parts |
| | diethylene glycol | 20 parts |
| | polyethylene glycol #200 | 10 parts |
| | water | 70 parts |
| Red ink: | C.I. Acid Red 35 | 2 parts |
| | diethylene glycol | 20 parts |
| | polyethylene glycol #200 | 10 parts |
| | water | 70 parts |
| Blue ink: | C.I. Direct Blue 86 | 2 parts |
| | diethylene glycol | 20 parts |
| | polyethylene glycol #200 | 10 parts |
| | water | 70 parts |
| Black ink: | C.I. Food Black | 2 parts |
| | diethylene glycol | 20 parts |
| | polyethylene glycol #200 | 10 parts |
| | water | 70 parts |

Evaluation Methods:

1) Ink Dryability

A recording medium on which letters had been printed by an ink jet recording method was allowed to stand at room temperature (20° C., 65% RH). Then, a time was measured that lapsed until an ink was dried and no longer attached to the finger when the printed image was touched with the finger, and it was evaluated according to the following grades.

⊚ . . . A time that lapses until ink is dried and no longer attached to the finger is within 10 seconds.

○ . . . A time that lapses until ink is dried and no longer attached to the finger is within 30 seconds.

Δ . . . A time that lapses until ink is dried and no longer attached to the finger is between 30 seconds and 1 minute.

× . . . A time that lapses until ink is dried and no longer attached to the finger is more than 1 minute.

2) Water Resistance

City water was sprayed onto a recording medium for 1 minute, on which letters had been printed by an ink jet recording method, and the appearance was then observed.

○ . . . The printed image remained completely unchanged.

Δ . . . The printed image was slightly stained, and discoloration occurred.

× . . . The printed image almost disappeared, and the coated film was torn completely.

3) Durability

A recording medium on which letters had been printed by an ink jet recording method was allowed to stand at 80° C. and 80% RH for 500 hours, and the appearance was then observed.

○ . . . The printed image remained completely unchanged.

Δ . . . The printed image was slightly stained, and discoloration occurred.

× . . . The printed image almost disappeared.

4) Feeding Property

Letters were printed on a recording medium with a printer at 35° C. and 85% RH. At this time, the condition was evaluated as follows.

× . . . Owing to the stickiness of the surface of the ink receiving layer, the recording medium is sticked to the feeding roller of the printer, and it cannot be fed.

Δ . . . Owing to a little stickiness of the surface of the ink receiving layer, the recording medium is hardly fed.

○ . . . The surface of the ink receiving layer is not sticky, and the recording medium can be fed.

5) Curliness

The curly condition of the recording medium prepared was observed.

○ . . . No curliness is observed.

Δ . . . Curliness is observed quite slightly.

× . . . Great curliness is observed.

TABLE 1

Formulation

| Formulation | Examples 1 | Examples 2 |
|---|---|---|
| (A) component (quaternary nitrogen-free ethylenically unsaturated group-containing compound) | | |
| (1) 2-hydroxyethyl acrylate | 8.6 | 4.4 |
| (2) bis (acryloyloxy) hydroxyethyl isocyanurate | 11.5 | 11.4 |
| (3) acryloylmorpholine | 28.7 | 28.5 |
| (B) component (ethylenically unsaturated group-containing compound having quaternary nitrogen) | | |
| methacrylamidepropyltrimethylammoniumdimethyl sulfate | 5.1 | 5.3 |
| (C) component (photopolymerization initiator) | | |
| (1) 1-hydroxycyclohexyl phenyl ketone | 2.9 | 2.9 |
| (2) Lucilin TPO | — | 2.2 |
| (D) component polymer | | |
| (1) PVA | 8.6 | 8.6 |
| (E) component (filler) | | |
| (1) wheat flour | 34.4 | 22.0 |
| (2) titanium oxide | — | 14.5 |
| Additive | | |
| (1) BYK-354 | 0.3 | 0.3 |

TABLE 2

Results of evaluation

| Properties (Evaluation items) | Examples 1 | Examples 2 |
|---|---|---|
| Ink dryability | ○ | ○ |
| Water resistance | ○ | ○ |
| Durability | ○ | ○ |
| Feeding property | ○ | ○ |
| Curliness | ○ | ○ |

TABLE 3

Formulation

| Formulation | | Examples 3 | Examples 4 | Examples 5 |
|---|---|---|---|---|
| (A) component | (1) | 12.3 | 12.3 | 12.0 |
| | (2) | 37.0 | 36.7 | 35.9 |
| (B) component | | 1.9 | 1.8 | 1.8 |
| (C) component | (1) | 3.1 | 3.1 | 3.0 |
| | (2) | — | 0.6 | — |
| | (3) | 1.2 | 1.2 | 1.2 |
| | (4) | 0.6 | 0.6 | 0.6 |
| (D) component | | 6.2 | 6.1 | 6.0 |
| (E) component | (1) | 24.7 | 21.4 | 23.9 |
| | (2) | — | 15.3 | — |
| | (3) | 12.3 | — | 12.0 |
| (F) component | | — | — | 3.0 |
| Additives | (1) | 0.6 | 0.6 | 0.6 |
| | (2) | 0.2 | 0.2 | 0.2 |

TABLE 4

Results of evaluation

| Properties (Evaluation items) | Examples | | |
|---|---|---|---|
| | 1 | 2 | 3 |
| Ink dryability | ○ | ○ | ⊙ |
| Water resistance | ○ | ○ | ○ |
| Durability | ○ | ○ | ○ |
| Feeding property | ○ | ○ | ○ |
| Curliness | ○ | ○ | ○ |

(Notes)

(A) component (quaternary nitrogen-free ethylenically unsaturated group-containing compound)
  (1): UV-125 urethane (supplied by Nippon Kayaku Co., Ltd.)
  (2): N-methoxymethylacrylamide (supplied by Nitto Riken Kogyo K.K.)

(B) component (ethylenically unsaturated group-containing compound having quaternary nitrogen)
  methacryloyloxyethyltrimethylammoniummethyl sulfate (supplied by Nitto Riken Kogyo K.K.)

(C) component (photopolymerization initiator)
  (1): Irg-184 (supplied by Ciba Geigy)
  (2): Lucilin TPO (supplied by BASF)
  (3): Irg-907 (supplied by Ciba Geigy)
  (4): EPA (supplied by Nippon Kagaku Co., Ltd.)

(D) component (polymer)
  modified polyvinyl acetate (supplied by The Nippon Synthetic Chemical Industry Co., Ltd.)

(E) component (filler)
  (1): wheat flour (supplied by The Nissin Flour Milling Co., Ltd.)
  (2): titanium oxide (supplied by Ishihara Sangyo Kaisha Ltd.)
  (3): barium sulfate (supplied by Sakai Chemical Industry Co., Ltd.)

(F) component [compound having quaternary nitrogen except (B)]
  ethyl sulfate lanolin fatty acid aminopropylethyldimethylammonium Additives
  (1): BYK-354 (supplied by Bick Chemie) (leveling agent)
  (2): BYK-057 (supplied by Bick Chemie) (defoamer)

As is clear from the results in Table 1, the film formed of the cured product of the photosensitive resin composition in the present invention is excellent in a fixing property and a water resistance of ink.

Since the film formed of the cured product of the photosensitive resin composition in the present invention is excellent in a water absorption and a water resistance, it is also high in an anti-fogging property, an antistatic property and an anti-slipping property.

When the cured product of the photosensitive resin composition in the present invention is used as an ink receiving layer of a recording medium in an ink jet recording method, it is excellent in a fixing property and a water resistance of ink. Especially, it is most appropriate for use in optical disk level printing.

INDUSTRIAL APPLICABILITY

The cured film of the photosensitive resin composition in the present invention has an anti-fogging property, an antistatic property and further an anti-slipping property. Accordingly, it can be used to impart an anti-fogging property to a glass or a film, an antistatic property to an electronic recording medium and an anti-slipping property to automobile seats and various grips (for example, golf clubs, bats, automobile handles and various tools etc.).

What is claimed is:

1. A photosensitive resin composition containing (A) N-alkoxymethylacrylamide as an ethylenically unsaturated group-containing compound which is devoid of a quaternary nitrogen and, (B) acryloyloxy lower alkyl tri-lower-alkyl ammonium lower alkyl sulphate as an ethylenically unsaturated group-containing compound having quaternary nitrogen, (C) a photopolymerization initiator, (D) a grain flour, and optionally (E) a polymer.

2. The photosensitive resin composition of claim 1, wherein the N-alkoxymethylacrylamide is N-methoxymethylacrylamide and the polymer is polyvinylpyrrolidone or modified polyvinylacetate.

3. The photosensitive resin composition of claim 1 in which (A) said N-alkoxymethylacrylamide as said ethylenically unsaturated group-containing compound which is devoid of a quaternary nitrogen is between 40 and 60% by weight, (B) said acryloyloxy lower alkyl tri-lower-alkyl ammonium lower alkyl sulphate as said ethylenically unsaturated group-containing compound having quaternary nitrogen is between 0.1 and 5% by weight, (C) said photopolymerization initiator is between 2 and 8% by weight, (D) said grain flour is between 10 and 40% by weight, and (E) said polymer is between 1 and 10% by weight.

4. An article having a thin film formed of a cured product of the photosensitive resin composition recited in claim 1 on the surface.

5. The article of claim 4, in which the thickness of the thin film formed on the cured product is between 1 and 100 μm.

6. The article of claim 5 which is a recording medium.

7. The article of claim 6, wherein the recording medium is an ink jet paper, OHP or an electronic recording medium.

8. The article of claims 4, 5, 6 or 7, wherein the thin film of the recording medium is printed with aqueous ink.

* * * * *